(No Model.)
C. R. BENTON.
STEAM GENERATOR.
No. 555,754. Patented Mar. 3, 1896.
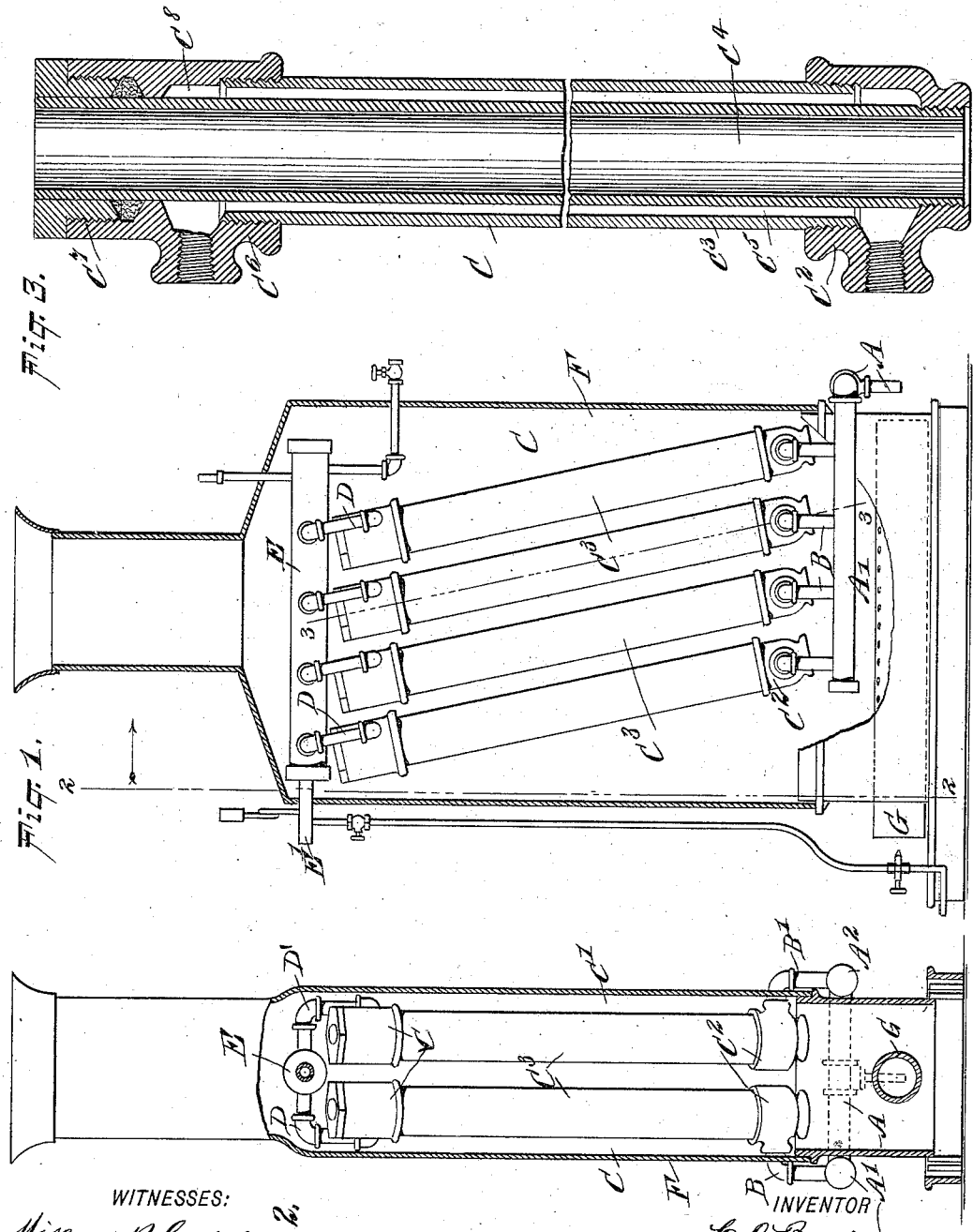
WITNESSES:
William P. Goebel.
Theo. G. Hoster
INVENTOR
C. R. Benton
BY Munn & Co
ATTORNEYS

UNITED STATES PATENT OFFICE.

CECIL R. BENTON, OF VERGENNES, VERMONT.

STEAM-GENERATOR.

SPECIFICATION forming part of Letters Patent No. 555,754, dated March 3, 1896.

Application filed July 24, 1895. Serial No. 557,007. (No model.)

*To all whom it may concern:*

Be it known that I, CECIL RICHARDSON BENTON, of Vergennes, in the county of Addison and State of Vermont, have invented a new and Improved Steam-Generator, of which the following is a full, clear, and exact description.

The invention relates to sectional boilers; and its object is to provide a new and improved steam-generator which is simple and durable in construction, very effective in operation, and arranged to insure a proper heating of the water at a comparatively small expenditure of fuel, and to insure the generation of steam having a uniform pressure.

The invention consists principally of two tubes, placed one within the other, to form an annular space between the tubes for the water and steam, an inlet for the lower end of the said annular space and an outlet for the upper end thereof.

The invention also consists of certain parts, and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is a transverse section of the same on the line 2 2 of Fig. 1, and Fig. 3 is an enlarged cross-section of one of the elements on the line 3 3 of Fig. 1.

The improved steam-generator is provided with a feed-water pipe A, formed into branch pipes A' and A², from each of which lead the pipes B and B', respectively, to which each connect with the lower end of an element C or C', extending upwardly in a slightly-inclined position, as is plainly indicated in Fig. 1.

The upper end of each element C or C' is connected by a pipe D or D' with a steam-dome E in the form of a longitudinally-extending pipe or tube, from the end of which leads the pipe E' for carrying off the steam to the desired place. The several elements are inclosed in a boiler-shell F of any approved construction, which also contains a burner G of any approved construction and located in the lower part of the shell under the several elements.

Each element C is provided at its lower end with a head $C^2$, into which opens the corresponding pipe B or B', and in which is screwed the lower end of the outer pipe, $C^3$, and the lower end of the inner pipe, $C^4$, forming with the pipe $C^3$ an annular space $C^5$, which opens into the head $C^2$, so that the feed-water can pass from the annular space in the head $C^2$ to the said annular space $C^5$ between the pipes $C^3$ and $C^4$.

The upper end of the outer pipe, $C^3$, screws into a head $C^6$, provided on its top with a stuffing-box $C^7$, projecting from the upper smooth end of the inner pipe, $C^4$. The head $C^6$ is formed with an annular space $C^8$, into which opens the upper end of the annular space $C^5$, so that the steam generated in that space can pass into the head $C^6$ and from the latter by the pipe D or D' to the steam-dome E. Now it will be seen that by having the space $C^5$ comparatively small the water is quickly converted into steam, as both the inner and outer pipes, $C^3$ and $C^4$, are heated by the heat from the burner G, it being understood that the heat passing through the tube $C^4$ also surrounds the pipes $C^3$ as well as the heads $C^2$ and $C^6$. Thus the water is very quickly converted into steam and a uniform pressure of the steam is insured owing to the uniform transformation of the water into steam. It is understood that the feed-water passes under pressure into the annular space $C^3$ from below to be converted into steam, which escapes from the upper end of the said space. It is also understood that by having a stuffing-box $C^7$ for the inner tube $C^4$ a ready expansion and contraction of the tubes can take place without injury to the heads and the pipes connected therewith.

Having thus fully described my invention, I claim as new and desire to secure by Letters Patent—

1. A steam-generator comprising the pairs of tubes placed one within the other, forming an intermediate annular space, the individual heads for each pair of tubes, such heads having internal recesses communicating with the spaces between the tubes and formed with nipples for connection with the said tubes and with the water and steam pipes, one of the heads having a stuffing-box through which the inner tube plays, substantially as set forth.

2. A steam-generator comprising the boiler-shell, the pairs of tubes arranged therein, and fitted one within the other forming intermediate spaces, the feed-water branch pipes extended along the outer sides of the shell, and water-pipes connected with the branch pipes, extended thence through the shell and communicating with the space between the inner and outer tubes, substantially as set forth.

3. The improved steam-generator herein described consisting of the boiler-shell, the feed-water branch pipes extended along the outer sides of said shell, the tubes arranged in pairs within said shell and set one within the other with an intermediate space, the individual heads for each pair of tubes, said heads having an internal recess communicating with the space between the tubes and the water-pipes connected with the water branch pipes extended through the boiler-shell and connected with the lower heads of the pairs of tubes, all substantially as described and for the purposes set forth.

CECIL R. BENTON.

Witnesses:
WM. G. BIXBY,
CUSTER INGHAM.